(12) United States Patent
Lappeteläinen et al.

(10) Patent No.: US 6,834,045 B1
(45) Date of Patent: Dec. 21, 2004

(54) ASSEMBLY, AND ASSOCIATED METHOD, FOR FACILITATING FREQUENCY ALLOCATIONS IN A RADIO COMMUNICATIONS SYSTEM TO ATTAIN STATISTICAL SPREADING OF ELECTROMAGNETIC ENERGY

(76) Inventors: Antti Lappeteläinen, Vallikuja 4 B 12, FIN-02600 Espoo (FI); Visa Smolander, Syrjäkuja 5 M, FIN-02760 Espoo (FI); Juha Salokannel, Toikantie 6 B 13, FIN-36240 Kangasala (FI); Mika Kasslin, Osmankäämintie 11, FIN-01300 Vantaa (FI)

( * ) Notice: Subject to any disclaimer, the term of this patent is extended or adjusted under 35 U.S.C. 154(b) by 675 days.

(21) Appl. No.: 09/613,354

(22) Filed: Jul. 11, 2000

(51) Int. Cl.[7] .................................................. H04Q 7/00
(52) U.S. Cl. ........................ 370/329; 370/437; 455/62
(58) Field of Search ................................ 370/201, 277, 370/281, 286, 310, 319, 328, 329, 330–334, 338, 343, 344, 347, 348, 431, 436, 437, 468; 455/39, 63, 154.1, 158.1, 158.2, 62

(56) References Cited

U.S. PATENT DOCUMENTS

| | | | | |
|---|---|---|---|---|
| 5,933,420 A | * | 8/1999 | Jaszewski et al. | ........... 370/329 |
| 6,016,428 A | * | 1/2000 | Diachina et al. | ............ 370/329 |
| 6,101,176 A | * | 8/2000 | Honkasalo et al. | ......... 370/335 |
| 6,292,475 B1 | * | 9/2001 | Swail | .......................... 370/329 |
| 6,377,608 B1 | * | 4/2002 | Zyren | ......................... 375/132 |
| 6,393,261 B1 | * | 5/2002 | Lewis | ........................ 370/338 |
| 6,580,704 B1 | * | 6/2003 | Wellig et al. | ................ 370/338 |

FOREIGN PATENT DOCUMENTS

WO    WO 01/37463 A1    5/2001

OTHER PUBLICATIONS

Broadband Radio Access Networks; HIPERLAN Type 2; Data Link Control Layer; Part 2 Radio Link COntrol sublayer, ETSI TS 101 761–2 V1.1.1, Apr., 2000, Section 5.2.2 pp. 71–85.*

ETSI 101 761–2 V1.1.1 (Apr. 2000); XP–002201464; Broadband Radio Access Networks (BRAN); Hiperlan Type 2; Data Link Control (DLC) layer; Part 2: Radio Link Control (RLC) sublayer; pp. 1–4; 71–85.

* cited by examiner

*Primary Examiner*—Chi Pham
*Assistant Examiner*—Anh-Vu H Ly

(57) ABSTRACT

Apparatus, and an associated method, by which to facilitate frequency channel allocation, and reallocation, in a radio communication system. Channel allocation and reallocation is effectuated to attain a desired statistical emission spectrum. Implementation is effectuated, for instance, in a WLAN system operable pursuant to the IEEE 802.11 standard but implemented in a 5 GHz frequency band.

19 Claims, 4 Drawing Sheets

Message: DFS_FREQUENCY_INFO  /66  /64  /68    62

| Size | Name | Explanation |
|---|---|---|
| 1 | Action | 0 - Change indication<br>1 - Frequency info |
| X | Frequency1 | The index of the frequency |
| X | MaxTxPwr | Maximum allowed transmission power in the proposed frequency (in dBm) |
| 1 | IsSecond | 0 - The second frequency field is not valid<br>1 - The second frequency field is valid |
| X | Frequency2 | The index of the frequency |
| X | NumberOfBeacons | The number of beacons before change frequency (valid in case that Action field value is 0) |

Message: DFS_FREQUENCY_INFO  /66  /64  /68  62

| Size | Name | Explanation |
|---|---|---|
| 1 | Action | 0 - Change indication<br>1 - Frequency info |
| X | Frequency1 | The index of the frequency |
| X | MaxTxPwr | Maximum allowed transmission power in the proposed frequency (in dBm) |
| 1 | IsSecond | 0 - The second frequency field is not valid<br>1 - The second frequency field is valid |
| X | Frequency2 | The index of the frequency |
| X | NumberOfBeacons | The number of beacons before change frequency (valid in case that Action field value is 0) |

| Size | Name | Explanation |
|---|---|---|
| 1 | Action | 0 - Change request<br>1 - Frequency info |
| 1 | FreeValid | 0 - FreeFrequency field not in use<br>1 - FreeFrequency field in use |
| X | FreeFrequency | The index of a Free frequency, which would be recommended, when making a frequency change |
| 1 | OccupiedValid | 0 - OccupiedFrequency field not in use<br>1 - OccupiedFrequency field in use |
| 1 | 802.11MACDetected | 0 - 802.11 MAC not detected on the Occupiedfrequency<br>1 - 802.11 MAC detected on the Occupied frequency |
| X | OccupiedFrequency | The index of the Occupied frequency, which should be avoided, when making a frequency change |

FIG. 4

| Size bits | Name | Explanation |
|---|---|---|
| 1 | Source | 0 - AP<br>1 - STA |
| 1 | Action | 0 - Change indication/request<br>1 - Frequency info |
| X | NumberOfBeacons | The number of beacons before change frequency (valid in case that Action field value is 0) |
| 1 | AllowNegotiation | 0 - No<br>1 - Yes |
| 2 | Response | 00 - Reject<br>01 - Accept<br>10 - Modify |
| 2 | NoFreqElements | The number of frequency elements in use in the emessage |
| X | FreqElement0 | See below |
| X | FreqElement1 | See below |
| X | FreqElement2 | See below |
| X | FreqElement3 | See below |

FIG. 5

ASSEMBLY, AND ASSOCIATED METHOD, FOR FACILITATING FREQUENCY ALLOCATIONS IN A RADIO COMMUNICATIONS SYSTEM TO ATTAIN STATISTICAL SPREADING OF ELECTROMAGNETIC ENERGY

The present invention relates generally to communications between communication stations of a radio communication system, such as a WLAN (Wireless Local Area Network) operable generally pursuant to the IEEE 802.11 standard. More particularly, the present invention relates to an assembly, and an associated method, by which to facilitate allocation of frequencies upon which to communicate data during operation of the communication system. Signal messages are generated and communicated between the communication stations to facilitate allocation of frequencies in a manner to attain a selected statistical spread of electromagnetic energy across a range of frequencies.

BACKGROUND OF THE INVENTION

Advancements in communication technologies have permitted the introduction, and popularization, of new types of communication systems. In various of such new types of communication systems, the rate of data transmission and the corresponding amount of data permitted to be communicated, has increased relative to existing types of communication systems.

New types of radio communication systems are exemplary of communication systems made possible as a result of advancements in communication technologies. Communication channels of a radio communication system are formed upon radio-links, thereby obviating the need for conventional wireline connections between sending and receiving stations operable therein. A radio communication system, therefore, inherently permits increased communication mobility in contrast to conventional wireline systems.

Bandwidth limitations sometimes limit the communication capacity of the communication system. That is to say, the bandwidth capacity of the communication channel, or channels, available to a communication system to communicate information between sending and receiving stations is sometimes limited. And, the limited capacity of the communication channel, or channels, limits increase of the communication capacity of the communication system. The communication capacity of the radio communication system is particularly susceptible to capacity limitation resulting from communication channel bandwidth limitations. Generally, a radio communication system is allocated a limited portion of the electromagnetic spectrum upon which to define communication channels. Communication capacity increase of a radio communication system is, therefore, sometimes limited by such allocation. Increase of the communication capacity of the radio communication system, therefore, is sometimes only possible if the efficiency by which the allocated spectrum is used is increased.

Digital communication techniques provide a manner by which the bandwidth efficiency of communications in the communication system may be increased. Because of the particular need in a radio communication system to efficiently utilize the spectrum allocated in such a system, the use of digital communication techniques is particularly advantageously implemented therein.

When digital communication techniques are used, information which is to be communicated is digitized. In one technique, the digitized information is formatted into packets, and the packets are communicated to effectuate the communication. Individual ones, or groups, of the packets of data can be communicated at discrete intervals, and, once communicated, concatenated together to recreate the informational content contained therein.

Because packets of data can be communicated at the discrete intervals, a communication channel need not be dedicated solely for the communication of packet data generated by one sending station to one receiving station as conventionally required in circuit-switched communications. Instead, a single channel can be shared amongst a plurality of different sending and receiving station-pairs. Because a single channel can be utilized to effectuate communications by the plurality of pairs of communication stations, improved communication capacity is possible.

Packet data communications are effectuated, for instance, in conventional LANs (Local Area Networks). Wireless networks, operable in manners analogous to wired LANs, have also been developed and are utilized to communicate packets of data over a radio-link, thereby to effectuate communications between a sending and a receiving station.

For example, an IEEE (Institute of Electrical and Electronic Engineers) 802.11 standard defines a system for operation of a wireless LAN. Three physical layers are defined in the 802.11, the 802.11a, and the 802.11b standards. The physical layers defined in the 802.11a standard already exist and form the 5 GHz 802.11 standard.

Proposals have been set forth to utilize an unlicensed band located at 5 GHz, also to implement a WLAN operable generally pursuant to the IEEE 802.11 standard. While 5 GHz band is unlicensed, at least in Europe, compliance with certain regulations must be met when communicating in the 5 GHz band. Such regulations include adherence to allowable electromagnetic emissions. A communication system operable at the 5 GHz band must be capable of dynamic adaptation to local interference conditions. Also, systems operable at the 5 GHz band must generate electromagnetic energy emissions which are spread over available frequency channels defined therein. The requirement is a statistical requirement that must be satisfied on a large scale rather than that of a single system. For instance, in systems operable in the 5,470–5,725 MHz range, electromagnetic emissions must be spread across a minimum of 255 MHz.

The IEEE 802.11 standard does not provide for dynamic frequency selection which would facilitate compliance with the electromagnetic emissions spreading regulations.

If a manner could be provided by which to adapt the IEEE 802.11 standard to facilitate frequency allocation upon which to communicate data during operation of a communication system to achieve emission spreading, a communication system operable pursuant to such standard could be used in the 5 GHz frequency band.

It is in light of this background information related to the communication of data in a radio communication system that the significant improvements of the present invention have evolved.

SUMMARY OF THE INVENTION

The present invention, accordingly, advantageously provides an assembly, and an associated method, by which to facilitate allocation of frequency channels in a radio communication system, such as a WLAN (Wireless Local Area Network) operable generally pursuant to the IEEE 802.11 standard.

Operation of an embodiment of the present invention provides a manner by which to facilitate frequency allocations of frequencies upon which to communicate data during operation of the communication system. Through appropriate frequency allocations, a selected statistical spread of electromagnetic energy, generated as a product of operation of the communication system, across a range of frequencies is achieved.

In one aspect of the present invention, a message is generated during operation of the radio communication system. The message is of a value to indicate that a change of frequency upon which to communicate subsequent data shall be changed. Such a message is broadcast at selected intervals. A mobile station operable in the communication system is turned-on, such as by exiting of the mobile station out of a sleep mode, and is able to detect the message broadcast at the selected intervals.

In another aspect of the present invention, a message is generated at the network infrastructure of the radio communication system. The message is of a value to indicate the frequency channel upon which to communicate subsequent data. In one message, a single frequency channel is indicated. In another message, more than one frequency channels are indicated from which subsequent selection is made.

In another aspect of the present invention, a message is generated at the network infrastructure of the radio communication system. The message is of a value to indicate, at least on a relative basis, when a change in frequency channel allocation shall be made. When detected by a mobile station, the mobile station is thereby able to determine when to become tuned to the newly-allocated frequency channel. The relative time is comprised of, for instance, a count of a number of beacons prior to which the frequency allocation change shall be effectuated.

In another aspect of the present invention, a message is generated at a mobile station operable in the radio communication system. The message is generated responsive to a prior message generated by the network infrastructure associated with a change in frequency allocation of a frequency channel upon which to communicate subsequent data. The message is of a value to select one of a first and at least a second frequency channel upon which to communicate the subsequent data.

In another aspect of the present invention, a message is generated at the mobile station of the radio communication system. The message is generated responsive to prior receipt of a message generated by the network infrastructure and communicated to the mobile station. The message is of a value to indicate whether the frequency channel upon which communication of data is subsequently to be made.

In another aspect of the present invention, a determination is made at the mobile station of the availability of newly-allocated frequency channels allocated to the mobile station for subsequent communication of data. If the frequency channel is determined to be available for the subsequent communications, an indication of the availability is returned to the network infrastructure. If a determination is made that the frequency channel or frequency channels are not available for subsequent communications, a corresponding indication is similarly returned to the network infrastructure.

In another aspect of the present invention, messages are generated by a mobile station which forms an IBSS (independent BSS) in an infrastructureless system. Messages representative of a change of frequency upon which to communicate subsequent data and of the selected frequency channel are transmitted by the IBSS.

In one implementation, a WLAN (Wireless Local Area Network) system constructed generally pursuant to the IEEE 802.11 standard is installed and operable at the 5 GHz band. Frequency channel allocations are made in manners to attain a selected statistical spread of electromagnetic energy across a range of frequencies. Messages are generated at both the network infrastructure and at a mobile station operable in the WLAN system. Network-generated messages are transmitted to the mobile station to inform the mobile station of a change in frequency channel allocation as well as indications of at when the frequency allocation changes shall be effectuated. Messages generated by the mobile station indicate whether a frequency channel is available upon which to communicate data as well as to acknowledge acceptance of an allocated frequency channel.

In these and other aspects, therefore, an assembly, and an associated method, is provided for facilitating dynamic selection of frequency allocations upon which to communicate data in a radio communication system. The radio communication system is operable to communicate data between a mobile station and a fixed-site communication station. The fixed-site communication station forms a portion of network infrastructure of the communication system. At least a first dynamic frequency selection message generator is coupled to at least one of the network infrastructure and the mobile station. The at least first dynamic frequency selection message generator generates a dynamic frequency selection message. The dynamic frequency selection message is of values indicative of an indicia associated with a frequency allocation by which to communicate subsequent data. The frequency allocation is made to attain a statistical spreading of electromagnetic energy over a selected frequency range.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWING

FIG. 3 illustrates a table showing the possible values of an exemplary DFS (Dynamic Frequency Selection) message generated during operation of an embodiment of the present invention.

FIG. 4 illustrates another table also showing the possible values of an exemplary DFS message generated during operation of an embodiment of the present invention.

FIG. 5 illustrates another table showing the possible value of another exemplary DFS message generated during operation of another embodiment of the present invention.

DETAILED DESCRIPTION OF THE PREFERRED EMBODIMENT

Figure 1:
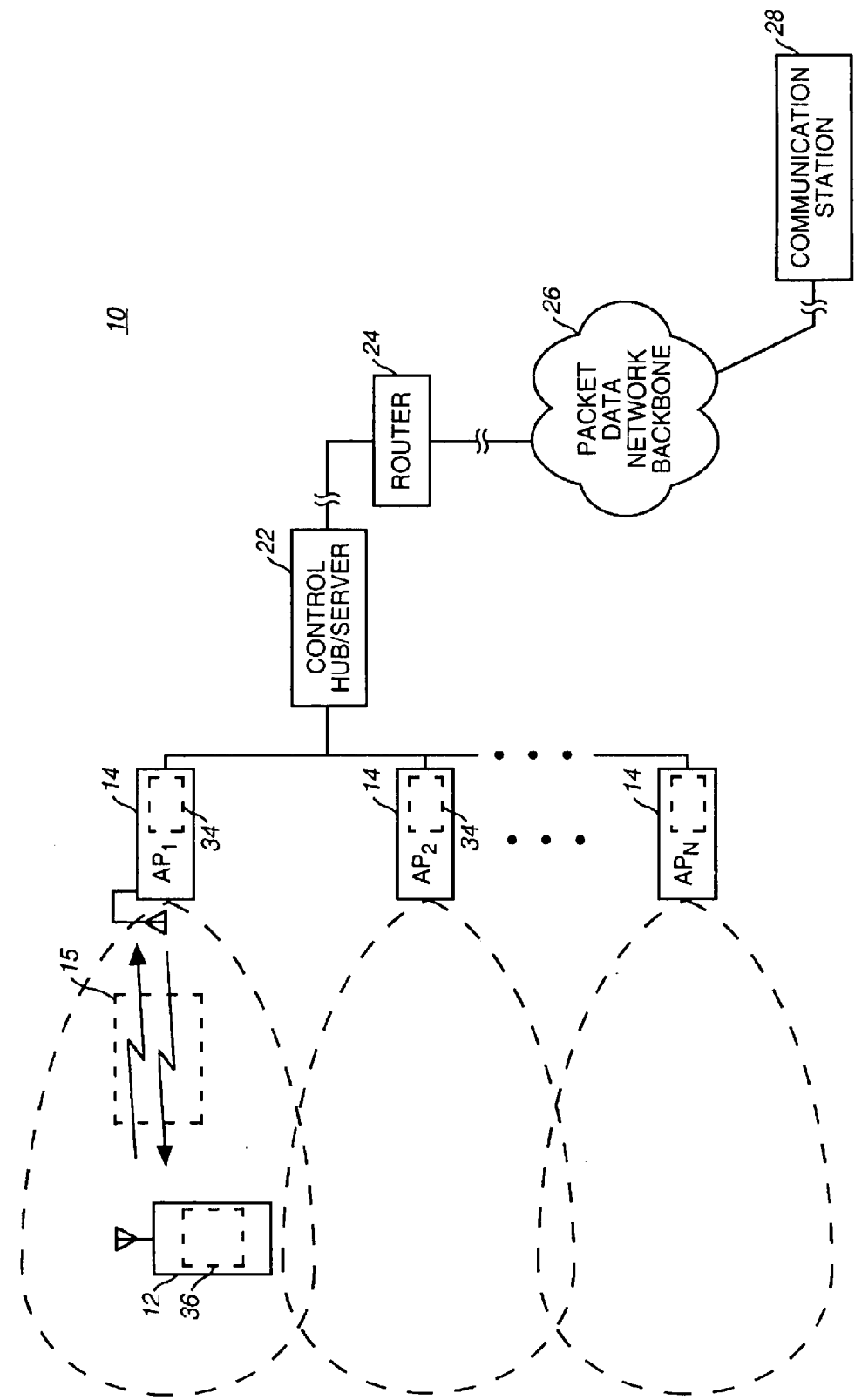
FIG. 1 illustrates a functional block diagram of a communication system, here constructed to the IEEE 802.11 standard, which embodies an embodiment of the present invention as a portion thereof.

Turning first to FIG. 1, communication system, shown generally at 10, is operable to communicate data between a mobile station 12 and a selected access point 14 which forms a portion of the network infrastructure of the communication system. In the exemplary implementation, the radio part of the communication system forms a WLAN (Wireless Local Area Network) constructed generally to be operable pursuant to the IEEE (Institute of Electrical and Electronic Engineers) 802.11 standard. The communication system is exemplary, and, while operation of an embodiment of the present invention shall be described below with respect to the exemplary communication system shown in FIG. 1, the teachings of the present invention are analogously applicable in other types of communication systems.

For instance, an embodiment of the present invention is operable in an infrastructure-free implementation in which selected mobile stations form IBSSs (independent BSSs). Messages described below to be generated by network infrastructure are, in an infrastructure-free implementation, generated by an IBSS.

During operation of the communication system, data is communicated by way of radio links 15 between the mobile station and a selected access point 14. Data communicated by the mobile station to the access point is sometimes referred to as being communicated on a reverse link channel, and data communicated by the access point 14 to the mobile station is sometimes referred to as being communicated upon a forward link channel. When data is communicated, either upon the forward or reverse link channels of the radio link 15, the data is communicated in the form of electromagnetic energy. The electromagnetic energy emissions are generated at frequencies corresponding to the frequencies at which the forward and reverse link channels of the radio link are defined. The existing IEEE 802.11 standard does not require spreading of emissions over a range of frequencies on a statistical basis. However, and as noted above, a radio communication system constructed to be operable in the 5 GHz range, at least in Europe, must exhibit electromagnetic emissions which are statistically spread throughout a range of frequencies. Operation of an embodiment of the present invention facilitates effectuation of emission spreading by providing messages to be signaled between the mobile station 12 and a selected access point 14.

The communication system 10 is further shown to include a control hub/server 22 coupled to the access points 14. The control hub/server 22 is operable, amongst other things, to control operation of the access points and communications in the WLAN system. The control hub/server is connected, here by way of a router 24 to a packet data network 26. And, in turn, the packet data network is coupled to a communication station 28. During operation of the communication system, communication of data between the mobile station 12 and the communication station 28 is possible through appropriate formation of a communication path therebetween.

While not shown, the control hub/server can also be coupled, through appropriate coupling elements to a PSTN (Public-Switched Telephonic Network) or other circuit-switched network, in conventional manner. Communication between the mobile station 12 and a circuit-switched communication station coupled to such a PSTN is analogously also possible by way of a suitable communication path formed therebetween.

In the exemplary implementation, each of the access points 14 includes a DFS (Dynamic Frequency Selection) message generator 34. And, the mobile station 12 includes a dynamic frequency selection message generator 36. The message generators 34 and 36 are operable pursuant to an embodiment of the present invention to generate messages to be communicated upon the radio link 14 to facilitate frequency channel allocation to attain a selected statistical emission spreading in compliance with the requirements related to operation of a radio communication system at the 5 GHz frequency band. In an implementation in which a mobile station forms an IBSS, i.e., in an infrastructure-free implementation, the functions performed at the message generator 34 are instead performed at the message generator 36.

Figure 2:
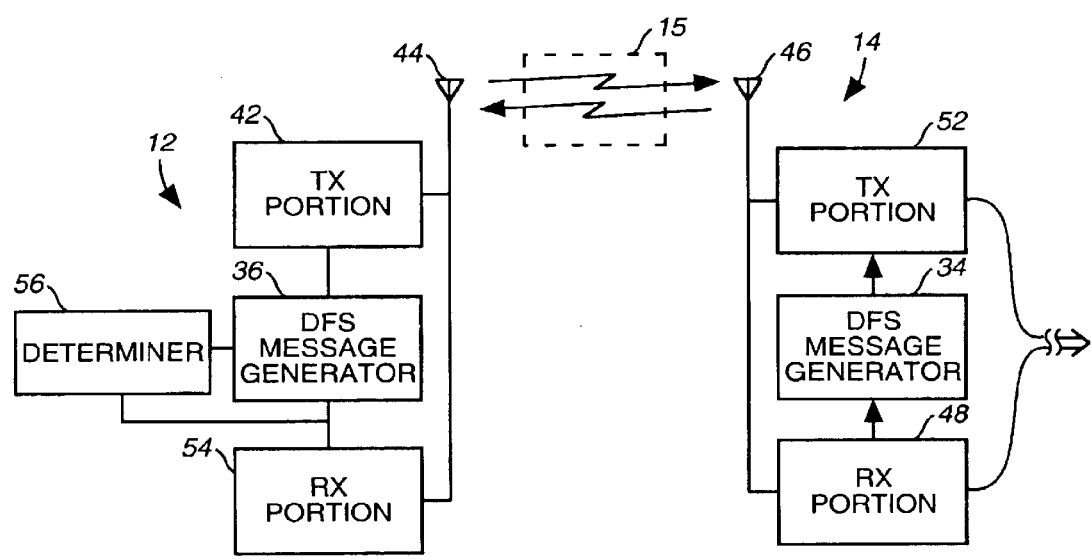
FIG. 2 illustrates a functional block diagram of a mobile station and an access point which form portions of the communication system shown in FIG. 1.

FIG. 2 again illustrates a mobile station 12 together with an access point 14, shown previously in FIG. 1. Communication of data is effectuated between the mobile station 12 and the access point 14 by way of a radio link 15. Data communicated by the mobile station 12 is generated at a transmit portion 42 and transduced into electromagnetic form at the antenna transducer 44, thereafter to be communicated by way of a channel defined upon the radio link 15 to the access point 14. The access point 14 includes an antenna transducer 46 capable of detecting the data communicated thereto by way of the radio link 16 and to convert the detected signal into electrical form and provide it to a receive portion 48 of the access point.

Analogously, data to be communicated by the access points to the mobile station is generated at, or provided to, a transmit portion 52 of the access point. Data to be communicated to the mobile station 12 is transduced by the antenna transducer 46, communicated upon a channel defined upon the radio link 15, thereby to be communicated to the mobile station 12. The antenna transducer 44 of the mobile station transduces the data detected thereat into electrical form, and indications thereof are provided to a receive portion 54 of the mobile station.

The access point 14 is again shown to include a DFS (Dynamic Frequency Selection) message generator 34, and the mobile station is again shown to include a DFS message generator 36.

The DFS message generators 34 and 36 are operable pursuant to an embodiment of the present invention to generate DFS messages to be communicated upon the radio link 15 to facilitate allocation of frequency channels upon which to communicate data, thereby to attain a selected spread of electromagnetic emissions over a selected frequency range.

Messages generated by the DFS message generator 34, for instance, are provided to the transmit portion 52 of the access point. The transmit portion converts the DFS message into a form to permit its transmission upon the radio link 16 and provides the DFS message to the antenna transducer 46 to be transduced therefrom. When detected at the antenna transducer 44 of the mobile station, the DFS message is converted into electrical form and provided to the receive portion 54 of the mobile station. Responsive to values of the DFS message, selected operation of the mobile station commences. If the value of the DFS message is indicative of a newly allocated frequency channel to which the mobile station should tune, a determination is made at a determiner 56 of the mobile station as to whether the channel is available for subsequent communications to be performed thereon. Responsive to determinations made by the determiner, the DFS message generator 36 is caused to generate a message to acknowledge whether the allocated frequency channel is available for subsequent data communications. The DFS message generator 36 is further operable to generate an acknowledgment to acknowledge reception at the mobile station of DFS messages generated by the access point.

An exemplary DFS message, here a DFS_FREQUENCY_INFO message 62, is generated during operation of the DFS message generator 34, as shown in FIG. 3. Fields of the message are indicated in the column 64 and the size associated with each field is indicated in the column 66. Permitted values of the associated field are noted in the column 68.

The message 62 is sent by an access point, or corresponding MAC entity acting as a first mobile station in the IBSS. The message is operable to indicate that the access point/first mobile station is changing the frequency channel allocation or to indicate the frequency channel to which the subsequent change shall be effectuated.

The first field, the "action" field, of a single bit size, is, when the bit is of a value of a logical one is a frequency indication and is broadcast periodically throughout a coverage area encompassed by the access point which transmits the message. By broadcasting the message at selected intervals, if a mobile station is in a sleep mode during a prior broadcast of the message, upon exiting the sleep mode, the mobile station is able to detect subsequently-generated messages. By repeatedly broadcasting the message, a need otherwise to wake all sleeping mobile stations out of a sleep mode prior to generation of a single message is obviated.

The message 62 can also be directed to a particular mobile station 12, such as during an initial association phase, to ensure that the newly-allocated frequency channel is made known to the mobile station.

When the action field is of a logical 1 value indicating that frequency channel information is contained in the message, as contrasted to a logical 0 in which a frequency change indication is provided by the message, a subsequent field, the frequency 1 field also forms a portion of the message. The frequency 1 field indicates the frequency channel to which the subsequent communications are to be communicated. An additional field, a maximum transmit power field, is further indicated in the message to provide mobile stations with indications of maximum transmit power levels at which data communications are permitted to be effectuated.

If more than one frequency channel is selectable, an additional field is added to a subsequent message 62 to include an indication of a second frequency field, a frequency 2 field, indicating the second frequency channel upon which subsequent communications shall be permitted. The second frequency is possible if the action equals 1 while the nr of beacons only when the action equals 0. A final field, a number of beacons field, indicates how far in the future, in terms of subsequently-generated beacons, that the frequency change shall take effect.

FIG. 4 illustrates a message, shown generally at 72, exemplary of a message generated by the DFS generator 36 during operation of an embodiment of the present invention. The message 72 includes a plurality of fields listed in the column 74 of field sizes indicated in the associated column 76 and which is of values indicated in the column 78. The message 72 here forms a DFS_PROPOSAL message generated by the DFS message generator 36 to an access point 14, or to a first mobile station. The message 72 is generated when the mobile station requests a frequency change or when the mobile station wants to indicate to an access point which of more than one frequency change selections are free, or, alternatively, are unavailable for subsequent communications.

If the determiner 56, for instance, determines that an allocated frequency channel is unavailable, e.g., occupied by another 802.11 MAC device, the message is generated and communicated to indicate such availability or, alternatively, unavailability of the frequency channel.

The first field, a free-valid field, is of a logical value to indicate that the allocated frequency channel either is, or is not, available for subsequent communications. The free frequency field contains a value of a frequency channel which is available and is recommended when a subsequent frequency channel reallocation shall be made. The occupied-valid field is of a logical value to indicate whether the occupied frequency field is, or is not, being utilized. The 802.11 MAC detected is of a logical value to indicate whether a MAC device is detected in the occupied frequency channel. And, the occupied frequency field contains an indication of the occupied frequency channel which should not be utilized for subsequent communications.

Determination is made whether a frequency channel is free or occupied, e.g., using primitives defined in the IEEE 802.11 standard. A MLME-SCAN request/confirm procedure is utilized in which a BSS type, BSSID, SSID scan type, channel list, minimum channel time, and maximum channel time parameter settings are utilized. The BSS type is set to ANY_BSS. The BSS_ID setting is set to all valid if not currently use and all but used MAC addresses in the BSS/IBSS if used channel/frequency. The SSID scan type is set to passive effused channel/frequency; active if other frequency. The channel list setting is set according to the DFS algorithm in the mobile station, usually channels indicated in the DFS_FREQUENCY_INFO message 62 or the used channel/frequency. A minimum channel time is selected and a maximum channel time equal to the minimum channel time is selected. During the minimum channel time, the MAC monitors whether the CCA indicates a busy medium.

In the IEEE 802.11 standard, a CSMA/CA setting has three CCA modes. The first mode is energy above threshold, a second mode is carrier sense with timer mode, and a third mode is a combination of the first two modes. DFS (Dynamic Frequency Selection) measurement on any of the other frequencies utilizing the third CCA mode.

Each frame defined in the IEEE 802.11a standard starts with a 16 microsecond preamble part. The PHY standard states that a start of a valid OFDM transmission at a receive level equal or greater than a minim 6 Mbit/s sensitivity (−82 dBm) shall cause the CCA to indicate a busy indication with a probability of greater than 90% within 4 microseconds. If the preamble portion is missed, the receiver shall hold the CS signal busy for any signal 20 dB above a minimum 6 Mbit/s sensitivity (−62 dBm).

The second CCA mode, noted above, measurement time is specified to be at least 22 microseconds in length (the actual value used is implementation-specific). In these measurements, a longer timer value of TIMER_1 milliseconds is used. If during that time period, a mobile station detects any energy above a threshold THRESHOLD_1=−62 dBm or detects a preamble, the frequency is marked as occupied. Even if the threshold is exceeded, the entire time is utilized measuring, in contrast to the third CCA mode, as the station searches the channels for other 802.11a traffic. If the station succeeds in synchronizing to a preamble, the mobile station may receive the actual data part of the transmission. The same method is used in handover measurements. In a handover measurement, the mobile station listens to the transmissions of other channels until another access point, e.g., a beacon generated therefrom, is located. If the MLME-SCAN confirm indicates a found BSS other than the own BSS, the channel/frequency is considered occupied, and the 802.11 MAC detected field in the DFS_PROPOSAL message is set to logical 1 value. If the MLME-SCAN confirm indicates that the BSS is not located, and CCA indicates a busy indication, the channel/frequency is considered to be occupied, and the 802.11 MAC detected field in the DFS_PROPOSAL message is set to a logical 0 value. If the MLME-SCAN confirm indicates that the BSS is not found and the CCA indicates an idle state, the channel/frequency is considered to be free and the 802.11 MAC detected field in the DFS_PROPOSAL message is set to a logical 0 value.

FIG. 5 illustrates another message, here a generic DFS message 92, generated during exemplary operation of another embodiment of the present invention. The message 92 is generated by either of the DFS message generators 34 or 36. A common format is utilized. The values indicate, however, whether the signal is generated at the access point or a mobile station. Again, the message includes a plurality of fields indicated in the column 94, each field of which is of a size indicated in the column 96, and which is of a value indicated in the column 98.

A first field, the source field, is of a logical value to indicate whether the message is being generated by the access point or the mobile station. The action field indicates whether the message is to indicate a change in frequency channel allocation or the frequency channel information. The number of beacons field is of a value to indicate the number of beacons prior to when the frequency change shall take effect.

An allow negotiation field is of a value to indicate whether negotiations are permitted between a mobile station and the access point. The response field is of a value to indicate rejection, acceptance, or modification of an allocated frequency channel. A no frequency elements field is of a value to indicate the number of frequency elements in use in the message. And, frequency element fields are of values to indicate frequency channels. Various message-types are creatable through the use of the generic DFS message format 92.

By providing a manner by which to exchange messages between the access point and the mobile station, allocation of frequency channels to attain a desired emission spreading can better be achieved.

The preferred descriptions are of preferred examples for implementing the invention, and the scope of the invention should not necessarily be limited by this description. The scope of the present invention is defined by the following claims.

We claim:

1. In a radio communication system for communicating data between a mobile station and a communication station, an improvement of an assembly for facilitating dynamic selection of frequency allocations upon which to communicate the data, said assembly comprising:

a first dynamic frequency selection message generator coupled to at least one of the communication station and the mobile station, said first dynamic frequency selection message generator for generating a dynamic frequency selection message, the dynamic frequency selection message of values indicative of indicia associated with a frequency allocation by which to communicate subsequent data, wherein the frequency allocation includes a first and at least a second frequency selection, the frequency allocation made to attain a statistical spreading of electromagnetic energy over a selected frequency range.

2. The assembly of claim 1 wherein said first dynamic frequency selection message generator is coupled to the communication station to form a portion thereof.

3. The assembly of claim 2 wherein the dynamic frequency selection message generated at the dynamic frequency selection message generator is of values indicative of whether a frequency allocation change of subsequent data communications is to be made.

4. The assembly of claim 3 wherein the dynamic frequency selection message generated at said first dynamic frequency selection message generator is further of values indicative of at least a relative time at which the frequency allocation change at which the subsequent communications are to be made shall occur.

5. The assembly of claim 1 wherein the radio communication system comprises a WLAN (Wireless Local Area Network) system generally operable pursuant to an IEEE (Institute of Electrical and Electronic Engineers) 802.11 standard and wherein said at least first dynamic frequency selection message generator generates the dynamic frequency selection message to cause alteration of the frequency allocation by which to communicate the subsequent data to attain the statistical spreading of the electromagnetic energy.

6. In a radio communication system for communicating data between a mobile station and a communication station, an improvement of an assembly for facilitating dynamic selection of frequency allocations upon which to communicate the data, said assembly comprising:

a first dynamic frequency selection message generator coupled to the communication station, said first dynamic frequency selection message generator for generating a dynamic frequency selection message, the dynamic frequency selection message of values indicative of indicia associated with a frequency allocation by which to communicate subsequent data wherein the frequency allocation includes a first and at least a second frequency selection, the frequency allocation made to attain a statistical spreading of electromagnetic energy over a selected frequency range; and a second dynamic frequency selection message generator, said second dynamic frequency selection message generator located at the mobile station, and said second dynamic frequency selection message generator also for generating a dynamic frequency selection message of values indicative of indicia associated with a frequency allocation by which to communicate subsequent data.

7. The assembly of claim 6 wherein the dynamic frequency selection message generated by said second dynamic frequency selection message generator is of values indicative of a request initiated at the mobile station of a frequency allocation change of subsequent data communications.

8. The assembly of claim 6 wherein the dynamic frequency selection message generated by said second dynamic frequency message generator is of values indicative of selection made at the mobile station of which at least two frequency allocation changes are to be made.

9. The assembly of claim 6 further comprising a determiner positioned at the mobile station, said determiner for determining availability of a channel defined by a frequency associated with a frequency allocation by which to communicate subsequent data.

10. In a WLAN (Wireless Local Area Network) system operable generally pursuant to an IEEE 802.11 standard, an improvement of apparatus for facilitating dynamic selection of frequency allocations upon which to communicate data between an access point and a mobile station, said apparatus comprising:

a dynamic frequency selection message generator for generating a dynamic frequency selection message, the dynamic frequency selection message of values associated with a change of frequency allocations upon which to communicate the data, the change made to attain a statistical spreading of electromagnetic energy generation over a selected frequency range; and a second dynamic frequency selection message generator, said second dynamic frequency selection message generator located at the mobile station, and said second dynamic frequency selection message generator also for generating a dynamic frequency selection message of values indicative of indicia associated with a frequency allocation by which to communicate subsequent data wherein the frequency allocation includes a first and at least a second frequency selection.

11. The WLAN system of claim 10, wherein the dynamic frequency selection message includes a first and at least a second frequency selection at which subsequent communications may be made.

12. In a method for communicating data between a mobile station and a communication station of a radio communication system, an improvement of a method for facilitating dynamic selection of frequency allocations upon which to communicate data, said method comprising:

generating a dynamic frequency selection message of values indicative of indicia associated with a frequency allocation by which to communicate subsequent data, wherein the dynamic frequency selection message is indicative of a first and at least a second frequency selection of a frequency allocation change at which subsequent communications are to be made, the frequency allocation made to attain a statistical spreading of electromagnetic energy generation over a selected frequency range; and communicating the dynamic frequency selection message between the mobile station and the fixed-site communication station.

13. The method of claim 12 wherein the dynamic frequency selection message generated during said operation of generating is generated at network infrastructure of the radio communication system.

14. The method of claim 12 wherein the dynamic frequency selection message generated during said operation of generating is indicative of whether a frequency allocation change of subsequent data communications is to be made.

15. The method of claim 14 further comprising the additional operation of selecting one of the first frequency selection and the second frequency selection at which to perform the subsequent communications.

16. The method of claim 15 further comprising the additional operation of communicating indications of the selection made during said operation of selecting between the mobile station and the communication station.

17. The method of claim 15 wherein said operation of selecting comprises determining whether the first frequency selection and the second frequency selection are available for the subsequent communications to be performed thereon.

18. In a mobile station operable to communicate data with a communication station in a radio communication system, an improvement of an assembly for facilitating dynamic selection of frequency allocations upon which to communicate the data, said assembly comprising:

a first dynamic frequency selection message generator coupled to at least one of the communication station and the mobile station, said first dynamic frequency selection message generator for generating a dynamic frequency selection message, the dynamic frequency selection message of values indicative of indicia associated with a frequency allocation by which to communicate subsequent data, wherein the frequency allocation includes a first and at least a second frequency selection, each frequency allocation made to attain a statistical spreading of electromagnetic energy over a selected frequency range.

19. The assembly of claim 18 wherein the dynamic frequency message generated in the first dynamic frequency selection message generator is of values indicative of whether a frequency allocation change of subsequent data communications is to be made.

* * * * *